Patented Mar. 28, 1939

2,151,984

UNITED STATES PATENT OFFICE 2,151,984

COLORED AROMATIC PHOSPHATE

Clarence L. Moyle and Shailer L. Bass, Midland, Mich., assignors to The Dow Chemical Company, Midland, Mich., a corporation of Michigan No Drawing. Application August 27, 1937, Serial No. 161,284

2 Claims. (Cl. 252—1)

This invention concerns colored aromatic phosphates which retain their color and stability at relatively high temperatures.

It is known that certain aromatic organic phosphates, particularly the liquid mixed triaryl phosphates and liquid mixtures of triaryl phosphates possess a number of properties desirable in indicating fluids which are to be exposed to high temperatures. For instance, such phosphates are chemically neutral and non-corrosive to the usual structural metals and have high boiling points, low vapor pressures, and desirable viscosity characteristics. They remain liquid over a wide range of temperatures and, in the absence of air, are stable against decomposition at high temperatures, e. g., 500°–600° F. However, such phosphates are colorless or nearly so, and unless artificially colored are poorly adapted for use as indicating fluids in gauges, manometers, thermometers, etc. A variety of dyes may be found which are soluble in the phosphates but most of such dyes undergo decomposition and discoloration when heated at temperatures above 300° F. in the presence of a phosphate for an appreciable period of time.

An object of this invention is to provide colored aryl phosphate compositions which may be heated at temperatures above 300° F. without appreciable change or loss of color; and which are suitable for use as indicating fluids at relatively high temperatures.

We have discovered that thio-indigoid dyes having the general formula:

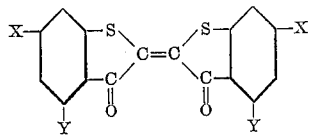

wherein Y represents a hydrogen or an alkyl group and X represents a hydrogen or a halogen group, are suitable for such purpose. Such dyes are readily soluble in aryl phosphates at room temperatures, retain their color upon heating at temperatures as high as 630° F. for long periods of time and may be obtained in a variety of colors.

The general procedure which we employ in testing colored aryl phosphates for color stability at elevated temperatures is to place the colored material (about 10 milligrams) and about 25 cc. of the phosphate in a small glass tube, replace the air in the tube with nitrogen, seal the tube, and then place it in an oil bath maintained at approximately 600° F. The condition of the solution is observed at the end of 5 hours and again at 40 hours. Similar tests are also made in the presence of air as well as in the presence of nitrogen. However, the aryl phosphates themselves are unstable in the presence of air at temperatures in the neighborhood of 600° F. and the colored decomposition products produced at these high temperatures gradually destroy or mask the color imparted to the solution by the dye.

We have found that Helindone Pink FF is especially suitable as a coloring material for aryl phosphates. Helindone Pink FF is a thio-indigoid dye, chemically known as 6,6'-dibrom-4,4'-dimethyl-2,2'-bis-thio-naphthene indigo, "Colour Index" No. 1211. The color is a brilliant shade of pink, which is retained unchanged upon heating at 600° F. Other thio-indigoid dyes of the above mentioned formula may be used, such as Thioindigo Red B, "Colour Index" No. 1207, and Ciba Red B, "Colour Index" No. 1210.

For example, 0.04 per cent solution of Helindone Pink FF in diphenyl-mono-ortho-xenyl phosphate retains its color upon heating at 600° F. for 40 hours. The dye is readily soluble in the phosphate at room temperature and imparts a distinctive pink color to the colorless phosphate. The depth of color may be varied by varying the proportion of dye in the phosphate.

The above-mentioned thio-indigoid dyes may be used for coloring any of the aryl phosphates, such as, di-phenyl-mono-ortho-chlorophenyl phosphate, di-ortho-xenyl-mono-phenyl phosphate, di-phenyl-mono-para-tertiarybutylphenyl phosphate, diphenyl-mono-tolyl phosphate, phenyl-di-tolyl phosphate, etc.

Other modes of applying the principle of our invention may be employed instead of those explained, change being made as regards the materials herein disclosed, provided the ingredients stated by any of the following claims or the equivalent of such stated ingredients, be employed.

We therefore particularly point out and distinctly claim as our invention:

1. A colored liquid composition of matter stable at temperatures above 300° F. against loss of color and suitable for use as an indicating fluid and the like, comprising a liquid triaryl phosphate and a small amount of a dye having the general formula

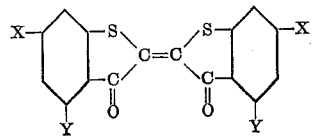

wherein Y represents a substituent selected from the group consisting of hydrogen and alkyl, and X represents a substituent selected from the group consisting of hydrogen and halogen.

2. A colored liquid composition of matter stable at temperatures above 300° F. against loss of color and suitable for use as an indicating fluid and the like, comprising a liquid triaryl phosphate and a small amount of the dye Helindone Pink FF.

CLARENCE L. MOYLE.
SHAILER L. BASS.